(No Model.)
W. E. STEINBACH.
TIRE FOR VEHICLE WHEELS.
No. 560,946. Patented May 26, 1896.
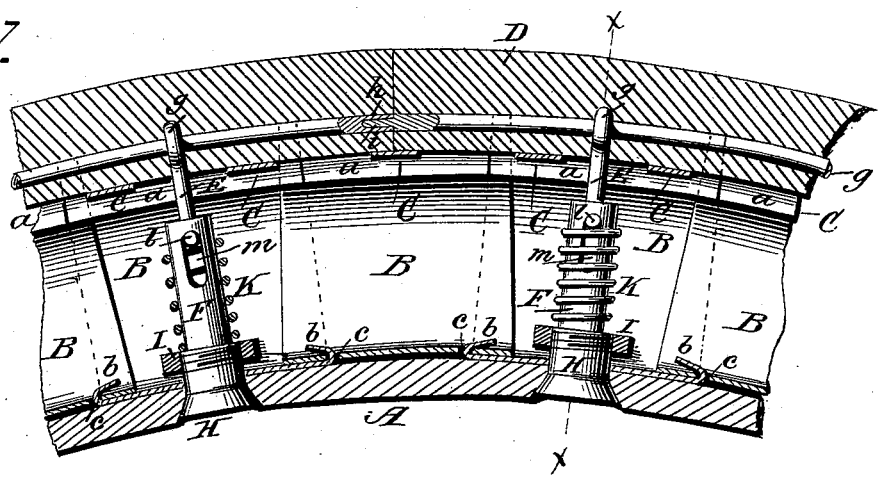
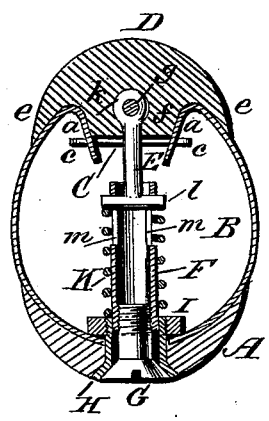
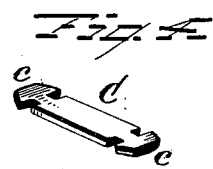
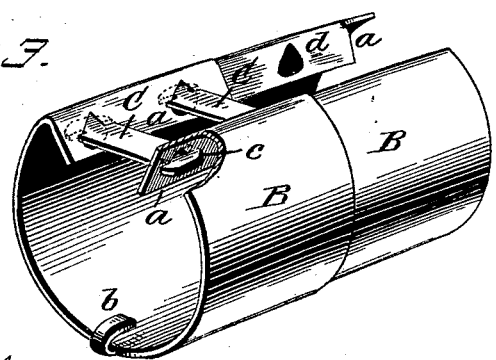
Witnesses
O. J. Williamson
Geo. M. Copenhaver
Inventor
William E. Steinbach
per Chas. H. Fowler
Attorney.

UNITED STATES PATENT OFFICE.

WILLIAM E. STEINBACH, OF PHILADELPHIA, PENNSYLVANIA, ASSIGNOR OF ONE-HALF TO GEORGE P. KEATING, OF SAME PLACE.

TIRE FOR VEHICLE-WHEELS.

SPECIFICATION forming part of Letters Patent No. 560,946, dated May 26, 1896.

Application filed March 3, 1896. Serial No. 581,612. (No model.)

*To all whom it may concern:*

Be it known that I, WILLIAM E. STEINBACH, a citizen of the United States, residing at Philadelphia, (Lawndale,) in the county of Philadelphia and State of Pennsylvania, have invented certain new and useful Improvements in Tires for Vehicle-Wheels; and I do hereby declare that the following is a full, clear, and exact description of the same, reference being had to the annexed drawings, making a part of this specification, and to the letters of reference marked thereon.

The present invention has relation to that class of cushion-tires for wheeled vehicles in which are employed a series of circular or curved flat metal springs connected together to form a continuous hollow tire around the rim of the wheel.

The object of the invention is to improve the construction of the above-mentioned class of tires, whereby their strength, durability, and effectiveness are materially enhanced; also, in providing an elastic tread and a spring-actuated device connecting therewith to bring the tread to its normal position after pressure is removed therefrom, as will be hereinafter described, and subsequently pointed out in the claims.

Figure 1 of the drawings represents a longitudinal vertical section of a portion of a rim of a vehicle-wheel constructed in accordance with my invention; Fig. 2, a transverse section thereof, taken on line $x\ x$; Fig. 3, a detail perspective view of a portion of the tire; Fig. 4, a detail perspective view of one of the braces for connecting the flanges upon the ends of the tire.

In the accompanying drawings, A represents the rim of a bicycle or other wheel, which may be of any preferred construction and upon which is seated the cushion-tire consisting of a series of metallic curved springs B, having inwardly-bent flanges $a$. These springs may be of any desirable shape, but preferably of the form shown in Fig. 2 of the drawings, and are placed continuously around the rim of the wheel, each alternate spring being set to slightly lap the inside of the springs adjacent thereto. These springs are connected one with the other upon the inner side thereof by hooks or rivets, or any other suitable fastening may be used for this purpose as found most desirable. I have shown in the drawings one of many forms of fastening devices that could be successfully used for the purpose, each alternate spring being formed with a tongue $b$, and each end thereof adapted to engage with a slot $c$ on the ends of the springs adjacent thereto, as shown in Fig. 1 of the drawings. The outer or open side of the tire in which the flanges $a$ are located is held in shape by suitable braces, or any preferred means may be employed that will connect the flanges. One of many forms of devices that may be used is shown in detail in Fig. 4 of the drawings, the braces C in the present instance being formed of sheet metal with notched ends $c$, which engage the openings $d$ in the flanges $a$, or in place of sheet metal wire or other form of braces may be used.

An elastic tread D, preferably of rubber, is connected to the outer side of the cushion-tire, which tread may be of any suitable thickness and of any preferred shape, although in the present instance it is shown as formed with overlapping flanges $e$ and a central neck $f$. The flanges of the tread bear upon the exterior of the tire, and the neck is seated in the space between the flanges thereof, the tread forming a cushion for the sides of the spring and in connection therewith materially increasing the elasticity and flexibility. The rubber or other elastic tread is held to the tire around the same by what I term a "spring-actuated" device that will force the tread outward to its normal position after pressure is removed therefrom.

Any suitable spring-actuated device that will serve the above purpose may be used in connection with a cushion-tire and an elastic tread, and there is shown in the present instance one of many such devices that will successfully attain this object. In describing such device there is used a wire $g$, which wire extends through the neck $f$ of the elastic tread circumferentially and the two meeting ends joined by forming therein a socket $h$ and the reduced end $i$ engaging the socketed end, as shown in Fig. 1 of the drawings. The joined ends of the wire are not fastened or rigidly connected together, but are free to adapt themselves to the contraction or expansion of the elastic tread.

A hanger E depends from the wire, said wire extending through an eye $k$ at one end thereof, and at the opposite end of the hanger is a cross-bar $l$, thus forming what I term a "T-shaped" hanger. The cross-bar $l$ engages the slots $m$, which are formed in a tubular support and guide F, which has interior screw-threads upon its inner end, which engages a suitable screw G. Encircling the screw is a sleeve H of a shape at its outer end to conform to the shape of the head of the screw, the sleeve extending through the rim and tire of the wheel and has exterior screw-threads upon its outer end, with which engages a nut I. A spiral spring K encircles the tubular support and guide F, its upper end bearing against the cross-bar $l$ and its lower end bearing on the nut I. Any number of these spring-actuated devices may be used throughout the circumference of the wheel as would be found necessary.

When the wheel is in motion, the elastic tread as it comes in contact with the ground or other surface over which it passes will be compressed, and as the pressure is removed the spring-actuated device will force the tread outward to its normal position, the device also forming a support and cushion to the tread and rendering its action more perfect.

The tire can be made continuous or in sections, and may be sectionally interchangeable, so that any one of the springs or sections of two or more springs may be readily replaced in case of fracture. The tire can be used on the ordinary bicycle-rim and can be sprung on or made fast with screw-bolts or other suitable fastenings, and may be used with the wheels of any forms of vehicles upon which a cushion-tire would be found desirable.

Having now fully described my invention, what I claim as new, and desire to secure by Letters Patent, is—

1. A cushion-tire comprising a plurality of detachable metallic curved springs having their free ends joined by a suitable connection or brace, an elastic tread, and a spring actuating device connecting the tread with the rim of the wheel, substantially as and for the purpose set forth.

2. A cushion-tire composed of a series of springs having its free ends bent to form inwardly-extending flanges, braces connecting the flanges, an elastic tread, and a spring-actuated device connecting the tread with the rim of the wheel, substantially as and for the purpose specified.

3. A cushion-tire for vehicles comprising a series of metallic springs suitably connected together, said springs having inwardly-extending flanges upon their free ends, suitable means for connecting the flanges together, an elastic tread having overlapping flanges and a central neck seated between the flanges, and a spring-actuated device connecting the tread with the rim of the wheel, substantially as and for the purpose described.

4. A cushion-tire for vehicles comprising a series of metallic springs having inwardly-extending flanges upon their free ends with openings therein, braces having notched ends engaging the openings, an elastic tread formed with side flanges and a central neck, and a spring-actuated device connecting the tread with the rim of the wheel, substantially as and for the purpose set forth.

5. A cushion-tire, an elastic tread, and a spring-actuated device for connecting the tread with the rim of the wheel, consisting of a slotted tubular support and guide, a T-shaped hanger connected thereto and to the tread, a spiral spring encircling the support and guide, and means for connecting the same to the tire and rim of the wheel, substantially as and for the purpose described.

In testimony that I claim the above I have hereunto subscribed my name in the presence of two witnesses.

WILLIAM E. STEINBACH.

Witnesses:
GEO. M. COPENHAVER,
FINIS D. MORRIS.